(12) United States Patent
DuBois

(10) Patent No.: US 6,420,490 B1
(45) Date of Patent: Jul. 16, 2002

(54) TELECHELIC POLYMERS ARE PRODUCED BY OZONATION DEGRADATION OF DIENE POLYMERS

(75) Inventor: Donn Anthony DuBois, Houston, TX (US)

(73) Assignee: KRATON Polymers U.S. LLC, Houston, TX (US)

( * ) Notice: Subject to any disclaimer, the term of this patent is extended or adjusted under 35 U.S.C. 154(b) by 0 days.

(21) Appl. No.: 09/448,664

(22) Filed: Nov. 24, 1999

Related U.S. Application Data

(60) Provisional application No. 60/110,581, filed on Dec. 2, 1998.

(51) Int. Cl.$^7$ ............... C08F 8/32; C08F 8/04
(52) U.S. Cl. ........... 525/338; 525/330.3; 525/330.5; 525/330.6; 525/379; 525/388
(58) Field of Search .................. 525/338, 379, 525/388

(56) References Cited

U.S. PATENT DOCUMENTS

| | | | |
|---|---|---|---|
| 3,312,744 A | 4/1967 | Farr et al. | |
| 3,392,154 A | 7/1968 | Baldwin | 260/77.5 |
| 3,427,351 A | 2/1969 | Nakagawa et al. | |
| RE27,145 E | 6/1971 | Jones | 260/880 |
| 3,864,324 A * | 2/1975 | Yukuta et al. | 525/333.1 |
| 3,941,847 A * | 3/1976 | Yukuta et al. | 525/333.2 |
| 3,950,304 A * | 4/1976 | Inomata et al. | 524/445 |
| 4,039,593 A | 8/1977 | Kamienski et al. | 260/635 E |
| 4,076,738 A | 2/1978 | Pecoraro | |
| 4,118,427 A | 10/1978 | Rhein et al. | |
| 4,336,356 A * | 6/1982 | Aharoni et al. | 525/388 |
| 4,358,566 A | 11/1982 | Ver Strate | 525/339 |
| 4,417,029 A | 11/1983 | Milkovich | 525/314 |
| 4,518,753 A | 5/1985 | Richards et al. | 526/177 |
| 4,753,991 A | 6/1988 | Bronstert | 525/98 |
| 5,268,431 A * | 12/1993 | Burroway et al. | 525/330.3 |
| 5,393,843 A | 2/1995 | Handlin, Jr. et al. | 525/332.8 |
| 5,424,356 A | 6/1995 | Parker et al. | |
| 5,484,857 A * | 1/1996 | Weider et al. | 525/332.8 |

FOREIGN PATENT DOCUMENTS

| | | |
|---|---|---|
| DE | 1802779 | 5/1969 |
| DE | 1520679 | 7/1969 |
| DE | 4402188 A1 | 7/1995 |
| EP | 0305718 B1 | 3/1989 |
| EP | 0522375 B1 | 1/1993 |
| EP | 0781793 A1 | 7/1997 |
| GB | 1162218 | 8/1969 |

OTHER PUBLICATIONS

"Preparation of α,ω–Aldehyde–Ended Telechelic Methyl Methacrylate Oligomers by the Oxidative Cleavage of Statistical Methyl Methacrylate–Buta–1,3–Diene Copolymers," by J.R. Ebdon and N.J. Flint, *European Polymer Journal*, vol. 32, No. 3, pp. 289–294, 1996.

* cited by examiner

*Primary Examiner*—Bernard Lipman

(57) ABSTRACT

A low molecular weight, telechelic polymer containing polar internal functionality is produced by (a) treating a copolymer of a polar alpha olefin and a conjugated diene with ozone to degrade the copolymer and form polymer segments which have aldehyde or ketone groups on the chain ends, wherein the copolymer has a random distribution of predominantly 1,4-diene double bonds and the pendant functional groups of the polar alpha olefin are stable to ozone, and (b) further reacting the aldehyde or ketone end groups to provide terminal functionality. The terminal functionality which can be provided includes carboxylic acid groups, primary hydroxyl groups, and amide groups.

7 Claims, No Drawings

TELECHELIC POLYMERS ARE PRODUCED BY OZONATION DEGRADATION OF DIENE POLYMERS

This application claims the benefit of U.S. Provisional Application No. 60/110,581, filed Dec. 2, 1998, the entire disclosure of which is hereby incorporated by reference

FIELD OF INVENTION

This invention relates to a process for producing telechelic functionalized polymers by ozonation degradation of diene polymers. More particularly, this invention relates to the synthesis of fully saturated mono-ol polymers and telechelic polymers containing reactive endgroups and polar midblocks.

BACKGROUND OF THE INVENTION

Functionalized anionically polymerized polymers of conjugated dienes and other monomers wherein the functionalization is terminal and/or internal are known. Particularly, U.S. Pat. No. 5,393,843 describes polybutadiene polymers having terminal functional groups. One of the methods described for making such polymers involves anionic polymerization utilizing a dilithium initiator such as the adduct derived from the reaction of m-diisopropenylbenzene with two equivalents of s-BuLi. Monomer is added to the initiator in hydrocarbon solution and anionic living polymer chains grow outwardly from the ends of the dilithium initiator. These polymers are then capped to form functional end groups as described in U.S. Pat. Nos. 4,417,029, 4,518,753, and 4,753,991. Of particular interest herein are terminal hydroxyl, carboxyl, sulfonate, and amine groups.

The aforementioned patent describes one method of making functionalized polymers. In order to get saturated functionalized polymers, a hydrogenation step is necessary. It would be advantageous to be able to produce such polymers without the necessity of the hydrogenation step. Also, it would be advantageous to be able to produce such polymers which contain polar functionality in the midblock or interior of the polymer. The present invention provides a method for accomplishing these desired results.

SUMMARY OF THE INVENTION

In one aspect of the present invention, a fully saturated monohydroxylated polyolefin polymer is produced by (a) treating an unsaturated polydiene polymer with ozone to degrade the polymer to polymer segments which have an aldehyde or ketonic group at the chain terminus; and (b) selectively reducing the aldehyde or ketone end group by treatment with hydrogen in the presence of a hydrogenation catalyst such as Raney nickel to form a polymer which has hydroxyl groups on the chain ends as shown in the following generic formula where R is hydrogen, methyl, or higher alkyl:

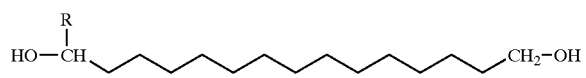

If R=H, then both ends have a primary hydroxyl group. In a preferred embodiment, the unsaturated polydiene polymer is butyl rubber which is a copolymer of polyisobutylene and isoprene or polyisobutylene and butadiene.

In another aspect of the present invention, a low molecular weight, telechelic polymer containing polar internal functionality is produced by (a) treating a copolymer of a polar alpha olefin and a conjugated diene with ozone to degrade the copolymer and form polymer segments which have aldehyde or ketone groups at the chain ends, wherein the copolymer has a random distribution of predominantly 1,4-diene double bonds and the pendant functional groups of the polar alpha olefin are stable to ozone, and (b) further reacting the aldehyde or ketone end groups to provide terminal functionality. The terminal functionality which can be provided includes carboxylic acid groups, primary hydroxyl groups, and amide groups.

DETAILED DESCRIPTION OF THE INVENTION

Polyolefin-co-polydiene polymers which are used as the starting polymer in the process of the present invention are well known. They can be produced by anionic polymerization of conjugated diene hydrocarbons with lithium initiators as described in U.S. Pat. Nos. 4,039,593 and Reissue 27,145 which are herein incorporated by reference. In this case, the resultant polymer must be partially hydrogenated. These polymers can also be produced by cationic polymerization using Lewis acid initiators. Anionic polymerization commences with a monolithium, dilithium, or polylithium initiator which builds a living polymer backbone at each lithium site.

Almost any polyolefin-co-polydiene polymer can be utilized in the present invention. The main requirement is that there be some C—C double bonds in the backbone of the polymer which are subject to degradative attack by ozone. Such polymers may contain polar internal functionality as described below. Thus, polymers which can be used in the present invention include butyl rubber, which is a copolymer of polyisobutylene (PIB) and isoprene or butadiene, partially saturated polyisoprene, partially saturated polybutadiene, copolymers of these dienes, polymers of other conjugated dienes, copolymers of conjugated dienes with styrene and styrene derivatives, and copolymers of conjugated diene with acrylic monomers. In order to obtain a telechelic polymer containing polar internal (ofttimes referred to as midblock) functionality, the starting polymer must be a copolymer of a polar alpha olefin and a conjugated diene. The polar comonomer in this copolymer is preferably an acrylate or methacrylate polymer but may also be acrylamide or similar structure:

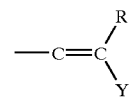

where Y=NR$_2$, NRH, NH$_2$, ester, or halide. For this copolymer, it is important that it contain a random distribution of predominantly 1,4-diene double bonds (where the degradation attack will take place), that the polar functional groups be pendant and inert to ozone, and that the molecular weight of the copolymer be high enough to afford an average functionality on the final polymer of at least 2.0. This means that the number average molecular weight of the precursor polymer should be at least 25,000, preferably 100,000. However, if polymers with lower functionality are desired, a lower number average molecular weight polymer can be used.

The starting polymers described above may be subjected to degradative ozonation through the use of a gas consisting wholly of ozone but more generally through the contacting of these polymers with gases such as air or oxygen containing up to 15 percent by weight of ozone. Mixtures of oxygen and ozone are preferred from a practical standpoint. The starting polymers are dissolved in a suitable solvent such as carbon tetrachloride, the straight or branched chain aliphatic hydrocarbons such as normal hexane, normal heptane, isohectane, isopentane, or any other non-reactive solvent for the polymer which is inert to ozone under the conditions of this invention. Generally, for convenience, the concentration of the polymer in the solvent will range from about a 1 percent to about 30 percent by volume, preferably about 10 percent to about 20 percent by volume. Into this solution, there is bubbled a stream of an ozone-containing gas while maintaining the temperature of between −80° C. and 85° C., preferably between −50° C. and 50° C., especially when the solvent is a hydrocarbon. Pressures of from atmospheric up to 500 psig, preferably from atmospheric up to 100 psig, may be employed. The higher pressure is used where the solvent would normally volatilize if temperatures in the upper range of those specified are employed. The time for carrying out the reaction may range from about 5 minutes to about 15 hours, preferably between 15 minutes to 2 hours is sufficient. U.S. Pat. No. 3,392,154, which is herein incorporated by reference, describes the ozonolysis of polymers of the type described herein. The conditions specified in the patent may generally be used in this invention.

The reaction conditions during ozonation are correlated so as to achieve, as far as possible, a polymeric ozonide which, on ozonolysis, will yield a polymer having the desired molecular weight and preferably a polymer in which each molecule has attached at each chain end a functional group. The primary decomposition of the ozonide of this type of polymer is believed to give rise to the formation of aldehyde or ketone functional groups at the chain ends.

The decomposition of the ozonides prepared as described above may be carried out in a number of ways. The ozonides, still in the solvent solution, may be subjected to small quantities of hydrogen, using a hydrogenation catalyst, or to an active hydrogen-containing compound such as water, tertiary amines such as pyridine and tributylamine, or to low molecular weight primary alcohol such as methanol, ethanol, etc.

The decomposition operation results in the formation of polymer chains having a lower molecular weight than those of the original polymer. Generally, the average theoretical molecular weight will be determined by $$\frac{MW_n \text{ copolymer}}{\text{Number double bonds per chain}}$$

There is at least one terminal radical per molecule and in most cases one at each end of the newly formed chains.

The new polymer of lower molecular weight can then further be oxidized by the use of conventional reagents such as air, oxygen, or by aqueous or non-aqueous solutions of oxidizing reagents, for example, peroxides such as hydrogen peroxide, sodium peroxide, solutions of hydrogen peroxide and aqueous sodium hydroxide or carbonate, peracids such as performic acid, peracetic acid, and perbenzoic acid, persulfates such as potassium persulfate, ceric salts such as ceric sulfate, potassium permanganate in mineral acid or alkalin solution, potassium ferocyanide, potassium dichromate, potassium bromate, and the like, such that the functional endgroups are substantially all converted to carboxyl groups. As a result, the starting polymer is converted to a degraded linear chain, low molecular weight compound having either hydroxyl endgroups on each chain or carboxyl groups on each chain or mixture of the two types of radicals.

The degraded polymer can also be reacted with amines to hydroaminate the polymer to form primary amide groups on the ends of the polymer. For example, the polymer may be treated with Raney nickel and an amine.

Since aldehyde or ketone groups are generally produced on each end of the polymer by ozonation, the polymers produced are telechelic polymers having aldehyde or ketone groups at each end. Depending on what polydiene is degraded, there can be two aldehyde groups (1,4 polybutadiene), two ketone groups, or one of each (polyisoprene). It is possible to produce a mono-ol polymer which has a primary hydroxyl group on one end of the polymer. Such polymers are advantageous because they can be used for a variety of applications as described in the aforementioned U.S. Pat. No. 5,393,843.

The PIB-co-isoprene or butadiene polymer which has been ozonated may be selectively reduced by using a Raney Nickel catalyst or other hydrogenation catalyst. This reduces the aldehyde endgroup to a primary hydroxyl group but leaves the ketone group on the other end of the chain intact. Ketones can be reduced but require more severe conditions than do aldehydes. Thus, this affords a way to make a saturated mono-ol polymer without the necessity of hydrogenating the entire polymer in the process. The Raney Nickel catalyst is successful in selectively reducing one endgroup of the polymer because the sterically-hindered ketone requires substantially more severe reaction conditions in order to hydrogenate. Other catalysts which could be used include palladium on carbon and ruthenium on carbon. The reduction reaction will generally be carried out at 70° C. to 120° C. for 10 to 300 minutes under pressures of 100 to 10,000 psi.

EXAMPLES

Example 1

A polyisobutylene mono-ol was prepared from commercial grade Exxon VISTANEX® butyl rubber with a number average molecular weight of 350,000 and an isoprene content of: 1,4=1.9 weight percent and 3,4=0.16 weight percent. The polymer was dissolved in cyclohexane and ozonated for five minutes at room temperature. Gel permeation chromatography analysis of the ozonated product showed that the polymer had a number average molecular weight of 5000 and a polydispersity of 2.2. Raney Nickel in the W-2 form was used to carry out the reduction at 400 psi hydrogen and 75° C. A great excess of nickel was needed (24 weight percent based on polymer) since the catalyst sat in a clump at the bottom of the reactor and had a limited surface area. After the reaction, the polymer cement was decanted as a water white liquid. The solvent was evaporated and the clear liquid polymer was characterized by FT-IR (Fourier-Transfer Infrared Spectroscopy) which revealed only the ketone signal. NMR also confirmed that only the aldehyde endgroups were reduced to primary hydroxy groups.

Example 2

The precursor polymer, N-butyl acrylate-co-butadiene, was made by the following process. All monomers were purified by elution down a column packed with activated alumina. 120 grams of N-butyl acrylate and 6 grams of 1,3-butadiene were transferred into a 500 milliliter polymerization bottle that contained a magnetic stir bar. 0.60 grams of AIBN free radical initiator dissolved in 12 milliliters of toluene was added to the monomer mixture. The reactor was heated to about 78° C. and allowed to stir for five hours. The polymer was coagulated in methanol and dried in a vacuum oven for 24 hours. NMR analysis of the copolymer revealed a composition of 92 mole percent N-butyl acrylate and 8 mole percent butadiene. The butadiene microstructure was approximately 8.5 mole percent 1,4- and 0.5 mole percent 1,2-.

The reaction with ozone was carried out according to the following procedure. Approximately 88 grams of N-butyl acrylate-co-butadiene was dissolved in cyclohexane to give a 28 weight percent cement (solution, slurry, suspension, etc.—i.e., mixture of the polymer and the cyclohexane). 0.25 milliliters of methanol was added for the purpose of decomposing the ozonides quickly. The cement was exposed to a stream of 2 percent ozone diluted in argon for one hour at room temperature. A significant decrease in the cement viscosity was observed. Gel permeation chromatography analysis revealed a polymer with a number average molecular weight of 3900 and a polydispersity of 2.15. The polymer cement was sparged with air for 2 hours at room temperature. NMR showed that the aldehyde carbonyl signals had vanished. IR showed a shoulder at 1710 cm$^{-1}$ for the —COOH groups.

I claim:

1. A process for forming a telechelic polymer, comprising:
   (a) treating a copolymer of a polar alpha olefin and a conjugated diene with a gas comprising ozone to degrade the polymer and form polymer segments which have aldehyde or ketone groups at the chain ends; and
   (b) further reacting the aldehyde or ketone end groups to provide terminal functionality.

2. A process for producing a telechelic polymer, comprising:
   (a) treating a copolymer of a polar alpha olefin and a conjugated diene with a gas comprising ozone to degrade the copolymer and form polymer segments which have aldehyde or ketone groups at the chain ends, wherein the copolymer has a random distribution of predominantly 1,4-diene double bonds and the pendant functional groups of the polar alpha olefin are stable to ozone; and
   (b) further reacting the aldehyde or ketone end groups to provide terminal functionality.

3. The process of claim 2 wherein step (b) involves simple oxidation of the aldehyde or ketone groups in air or oxygen to form carboxylic acid groups on each end of the polymer segments.

4. The process of claim 2 wherein step (b) comprises reducing the aldehyde or ketone groups with hydrogen to form primary hydroxyl groups on the ends of the polymer segments.

5. The process of claim 2 wherein step (b) comprises hydroaminating the adlehyde or ketone groups to form primary amide groups on the ends of the polymer segments.

6. The process of claim 1, wherein the telechelic polymer has an average functionality of at least 2.0.

7. The process of claim 1, wherein the telechelic polymer has a number average molecular weight of at least 25,000.

* * * * *